May 12, 1959  W. R. HINES  2,886,091
WHEEL TRACTION DEVICE
Filed Oct. 4, 1957  2 Sheets-Sheet 1
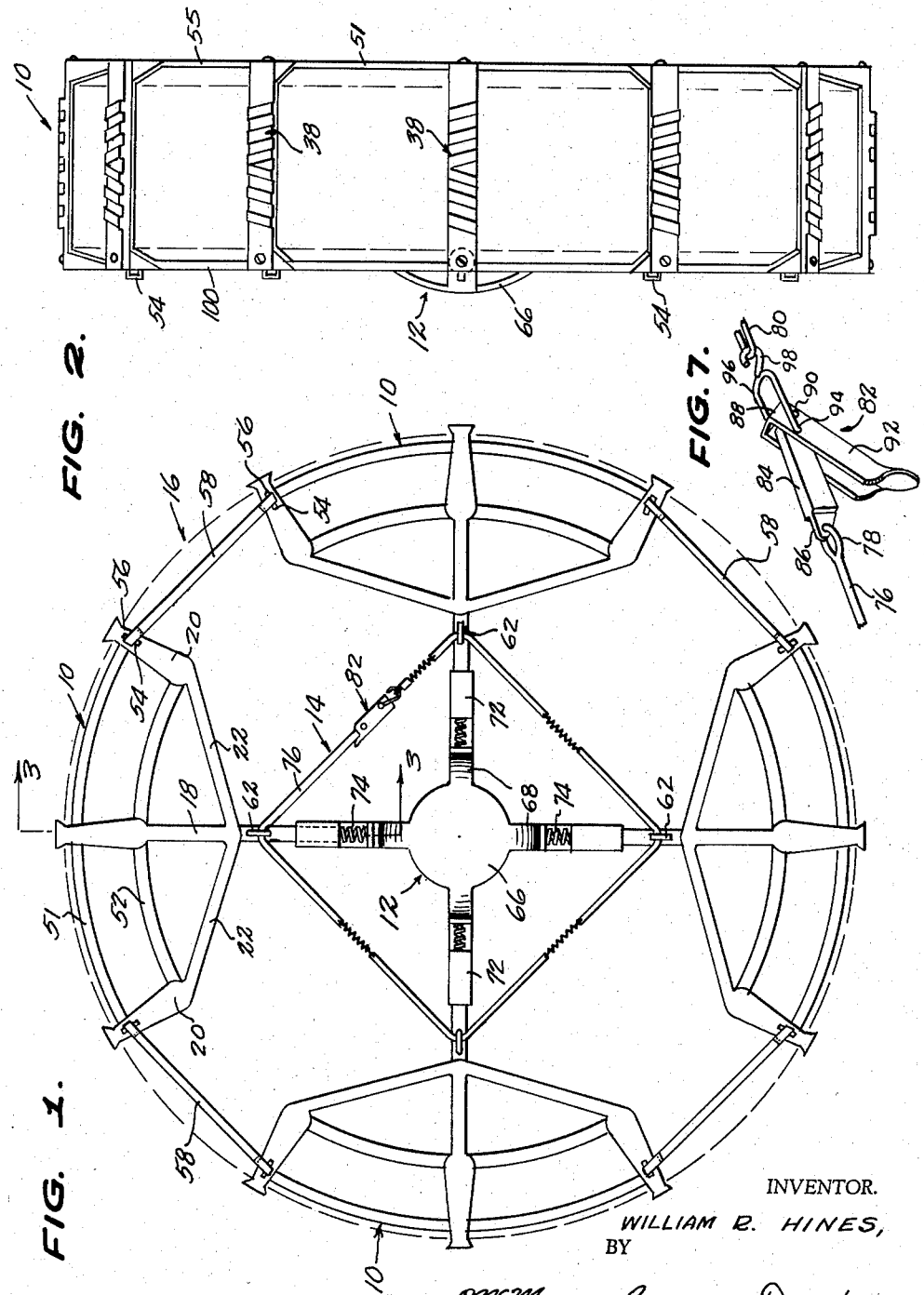
INVENTOR.
WILLIAM R. HINES,
BY
McMorrow, Berman + Davidson
ATTORNEYS.

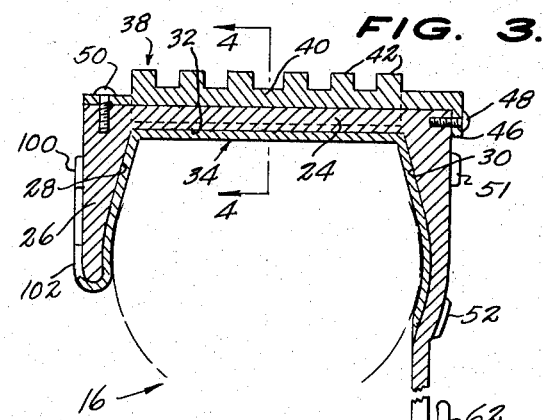
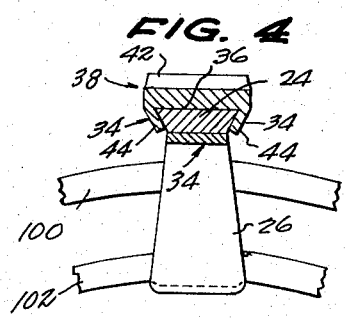
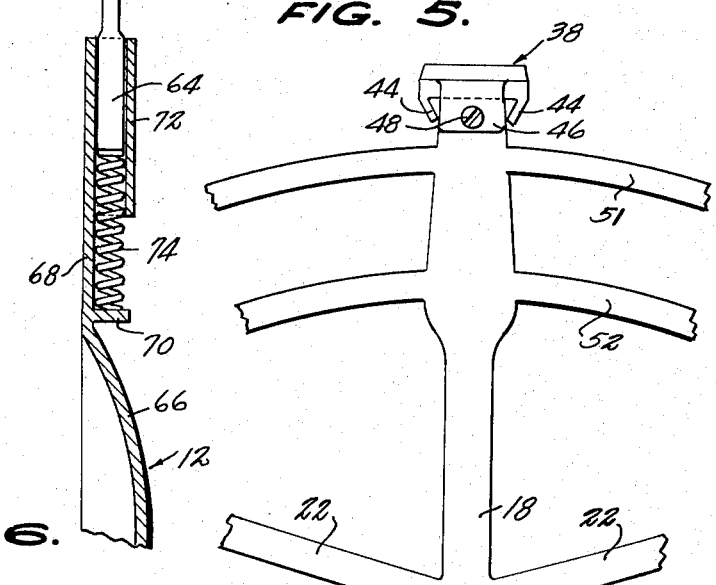
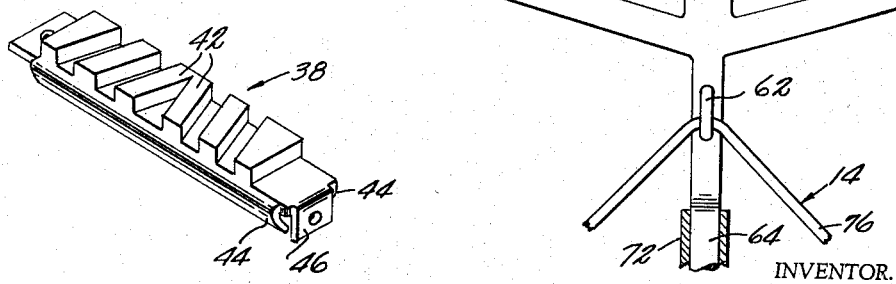

United States Patent Office 2,886,091
Patented May 12, 1959

2,886,091

WHEEL TRACTION DEVICE

William R. Hines, Mount Shasta, Calif.

Application October 4, 1957, Serial No. 688,334

2 Claims. (Cl. 152—228)

This invention relates to an improved traction device for pneumatic tire vehicle wheels, the device being applicable to a wheel from the outboard side of the wheel.

The primary object of the invention is to provide a more practical and efficient device of the kind which is quickly and easily applicable to and removable from a wheel, the device being composed of a plurality of relatively rigid traction elements which are maintained in circumferentially spaced relation to each other by association with a rigid spider, relative to which the traction elements are movable only radially, and wherein spring-tensioned means engaged with the traction elements maintains the traction elements in clamping engagement over the tire of a wheel, the spaced relation of the traction elements relative to each other in service of the device being further assured by rigid links connected to and extending between adjacent traction elements.

Another object of the invention is to provide a traction device of the character indicated in which the traction elements are relatively long and have each a plurality of circumferentially spaced traction cleats arranged, so that traction cleats are relatively closely spaced from each other entirely around the tread of a wheel tire at relatively small regular intervals, rather than at widely spaced irregular intervals.

A further object of the invention is to provide a traction device of the character indicated above which can be made in well-finished, rugged, and serviceable form at relatively low cost, and in which the traction elements, the spider, and the spring-tensioned means can be disconnected from each other and packed in a relatively small container for storage and shipment.

Other important objects and advantageous features of the invention will be apparent from the following description and the accompanying drawings, wherein, for the purposes of illustration only, a specific form of the invention is set forth in detail.

In the drawings:

Figure 1 is an outboard side elevation of a device of the invention in assembled condition;

Figure 2 is an end or edge elevation of Figure 1;

Figure 3 is an enlarged contracted and fragmentary vertical transverse section, taken on line 3—3 of Figure 1;

Figure 4 is a fragmentary vertical longitudinal section taken on the line 4—4 of Figure 3;

Figure 5 is a fragmentary outboard side elevation looking from right to left in Figure 3, partly in section;

Figure 6 is a perspective view of a removable traction cleat; and

Figure 7 is a fragmentary perspective view of the tensioning clamp and associated tensioning cable.

Referring in detail to the drawings, wherein like numerals designate like parts throughout the several views, the illustrated traction device comprises a plurality of traction elements, each generally designated 10, and here shown as being four in number, a spider 12, and a traction element tensioning or tightening element 14, for clamping the traction elements 10 over the tire 16 of a vehicle wheel (not shown).

Each traction element 10 is in the general form of a segmental tire embracing hook of relatively great circumferential length, composed of a relatively long diametrical center arm 18 and two relatively short radial outer arms 20 having angled portions 22 on their inward ends extending to and fixed to an intermediate part of the center arm 18. The outward end of each of the arms 18 and 20 terminate in preferably integral, reclining inboardly extending L-shaped traction bars 24 which terminate at their inboard ends in radially inwardly projecting terminals 26, as particularly clearly shown in Figure 3. The inner sides 28 and 30 of the terminal 26 and of tire 16 opposite part of the arms 18 and 20 are contoured to conformably engage related side walls of a tire 16, while the inward sides 32 of the bars 24 are relatively flat for engaging the tread of a tire 16. A non-chafing friction liner 34 is secured to the sides 28, 30 and 32 for harmless engagement with a tire 16.

As shown in Figure 4, the traction bars 24 have inwardly beveled sides 34 and flat radially outward sides 36, so that the traction bars 24 are wedge-shaped in cross section. Slidably engaged on the traction bars 24 are removable and replaceable traction cleats 38 which comprise elongated flat body portions 40 having longitudinal spaced traction lugs 42 on the outward sides, and inwardly angled longitudinal flanges 44 on their sides, so that the traction cleats 38 slide conformably over the bevelled sides 34 and the outward sides 36 of the traction bars. The cleats 38 terminate at their outboard ends in inwardly directed lugs 46 which are removably secured to the outboard sides of the arms 18 and 20 by such as a screw 48. Other screws 50 traverse the inboard ends of the cleat body portions 40 and thread into the inboard ends of the traction bars 24. The traction cleats 38 are thereby easily removable and replaceable.

For further rigidifying the traction element arms 18 and 20, arcuate outer and inner brace bars 51 and 52 extend between and are fixed to the outboard sides of the arms 18 and 20. On each end arm 20 of each traction element 10 are loops 54 in which are removably engageable the hooked ends 56 of traction element spacing and connecting links 58 which extend between adjacent traction elements 10.

On the outboard side of each center arm 18 inwardly of the angled outer arm portions 22 of each traction element there is fixed a radially outwardly opening hook 62 for engagement by the tensioning element 14.

The center arms 18 of the traction elements 10 terminate in elongated enlarged diameter cylindrical plungers 64.

The spider 12, with which the plungers 64 are engaged, is rigid, and comprises a concave-convex disc hub 66 on whose perimeter are radial arms 68 which have on their outboard sides spring seats 70 and spaced radially outwardly therefrom, open radial cylinders 72, in whose outer ends related plungers 64 are removably engaged. In the cylinders 72 between the radially inward ends of the plungers 64 and the seats 70 are compressed helical springs 74, which are secured in suitable manner (not shown) to the seats 70, and serve to yieldably urge the traction elements 10 in radially outboard directions relative to the spider 12, and to take up any lost motion between the traction elements 10 and the spider during service of the device. The hub 66 is designed to accommodate without contact, the usual hub of a wheel on which the device is installed.

The tensioning or tightening element 14 which is engaged with the hooks 62 on the center arms 18 of the traction elements so as to clamp the traction bars 24 on a tire 16, comprises a preferably coil-spring elastic band 76 having loop ends 78 and 80. Between the ends of the band 76 is a tightening clamp, generally designated 82, which comprises an elongated bar 84 having an eye 86 on one end with which is engaged the band end loop 78. Eccentrically pivoted at one end 88 at 90 on the other end of the bar 84 is an elongated channel lever 92 having eccentrically pivoted thereon at 94 a U-shaped yoke 96 having a hook 98 removably engaged through the end loop 80 of the band 76. The band 76 is relatively relaxed when the channel lever 88 is in the open position shown in Figure 7, and fully tensioned when the lever 88 is closed, as shown in Figure 1. The elastic band 76 opposes the action of the springs 74 in clamping the traction elements 10 on a wheel tire, and coacts with the springs in eliminating lost motion between the traction elements 10 and an associated tire 16.

Extending between and fixed to the inboard sides of the terminals 26 on the traction bars 24 of each of the arms 18 and 20 of each traction element 10, are arcuate outer and inner spacing and connecting brace bars 100 and 102.

The above described arrangements of traction elements 10 and their traction cleats 38 are such that the traction cleats are relatively closely spaced at regular intervals around the tread of a tire 16, so as to reduce a tire bumping and noise during use of the device.

To remove the device from a wheel, and advantageously at the same time disassemble the device for compact storage, the tightening element clamp 82 is opened so as to relax the band 76. The band 76 is then disengaged from the hooks, and the traction element plungers 64 removed from the spider cylinders 72, whereat the separated traction elements 10, the spider 12, and the band 76 can be stacked or otherwise compactly arranged in a suitable container (not shown), such as a bag or box, to be carried in the trunk compartment of a vehicle.

Although I have shown and described herein a specific embodiment of the invention, it is to be understood that any change or changes in the form of and in relative arrangements of components can be made within the scope of the appended claims.

What is claimed is:

1. In a pneumatic tire vehicle wheel traction device, a plurality of rigid traction elements having radially inwardly extending center arms, a rigid spider having radial arms with which said center arms are engaged and are confined to radial movement relative to the spider, and a resilient clamping element engaged with portions of said center arms for clamping the traction elements on a vehicle wheel tire, and compression spring means acting between the spider arms and the free ends of said center arms and yieldably urging said traction elements in radially outward directions and in opposition to said resilient clamping element.

2. In a pneumatic tire vehicle wheel traction device, a plurality of rigid traction elements having radially inwardly extending center arms, a rigid spider having radial arms with which said center arms are engaged and are confined to radial movement relative to the spider, and a resilient clamping element engaged with portions of said center arms for clamping the traction elements on a vehicle wheel tire, said center arms terminating at their radially inward ends in plungers, said spider arms having cylinders thereon in which said plungers are reciprocably engaged, and compressible springs in said cylinders and acting between portions on the spider arms and on the plungers and yieldably urging the traction elements radially outwardly relative to the spider.

References Cited in the file of this patent
UNITED STATES PATENTS

| | | |
|---|---|---|
| 1,803,563 | Sagen | May 5, 1931 |
| 2,559,425 | Haracz | July 3, 1951 |
| 2,596,096 | Brandvold | May 13, 1952 |
| 2,767,761 | O'Higgins | Oct. 23, 1956 |